United States Patent
Muecke et al.

(10) Patent No.: US 11,680,593 B2
(45) Date of Patent: Jun. 20, 2023

(54) RETAINING CLAMP OF A QUICK RELEASE FASTENING DEVICE, A QUICK RELEASE FASTENING DEVICE AS WELL AS A COMPONENT CONNECTION WITH THIS QUICK RELEASE FASTENING DEVICE

(71) Applicant: Böllhoff Verbindungstechnik GmbH, Bielefeld (DE)

(72) Inventors: Michaela Muecke, Detmold (DE); Heinrich Heinrichs, Vlotho (DE); Jan Norman Kratzsch, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 33 days.

(21) Appl. No.: 17/118,248

(22) Filed: Dec. 10, 2020

(65) Prior Publication Data

US 2021/0190105 A1 Jun. 24, 2021

(30) Foreign Application Priority Data

Dec. 20, 2019 (DE) .......................... 102019135611.3

(51) Int. Cl.
*F16B 5/02* (2006.01)
*F16B 2/02* (2006.01)

(52) U.S. Cl.
CPC . *F16B 5/02* (2013.01); *F16B 2/02* (2013.01)

(58) Field of Classification Search
CPC .... F16B 5/02; F16B 2/02; F16B 21/02; F16B 21/076; F16B 37/043; F16B 21/073;
(Continued)

(56) References Cited

U.S. PATENT DOCUMENTS 4,610,588 A    9/1986   Van Buren, Jr. et al.
4,925,351 A *   5/1990   Fisher .................. F16B 37/043
                                                                           411/182
(Continued)

FOREIGN PATENT DOCUMENTS

CN         102216626 A    10/2011
DE           9101514 U1    5/1991
(Continued)

OTHER PUBLICATIONS

EP Search Report for EP Application No. 20207012.4 dated Apr. 9, 2021 (9 pages).
(Continued)

*Primary Examiner* — Jason L Vaughan
*Assistant Examiner* — Amanda Kreiling
(74) *Attorney, Agent, or Firm* — Reising Ethington P.C.

(57) ABSTRACT

A retaining clamp of a quick release fastening device, which is latchable in a component opening and in which a fastening bolt is lockable, comprising the following features: two spring legs arranged opposite to each other in a V-shape, the arrangement of which comprises a tapered open end at which the V-shaped spring legs are not connected to each other, and the arrangement of which comprises a widened end, at which the V-shaped arranged spring legs are connected to each other via a connection web with a central passage opening, and each of the two spring legs arranged in a V-shape comprises a central window with a spring web arranged therein, which is fastened at one side and is at least once angled in its course in the direction of the widened end.

11 Claims, 9 Drawing Sheets

(58) Field of Classification Search
CPC .. F16B 19/1081; F16B 21/065; F16B 21/075; F16B 21/078; F16B 21/20; F16B 37/0842; Y10T 24/30; Y10T 24/303; Y10T 24/44026; Y10T 24/45105; B60R 13/0206; B60R 11/00; B60R 13/02; Y10S 411/913
See application file for complete search history.

(56) References Cited

U.S. PATENT DOCUMENTS

| | | | |
|---|---|---|---|
| 5,011,355 | A | 4/1991 | Motoshige |
| 5,774,949 | A * | 7/1998 | Cornell ................... F16B 5/125 24/297 |
| 5,873,690 | A * | 2/1999 | Danby ................. F16B 37/043 411/61 |
| 8,474,111 | B2 | 7/2013 | Ribes Marti |
| 8,636,454 | B2 | 1/2014 | Okada et al. |
| 9,440,596 | B2 | 9/2016 | Huelke et al. |
| 2002/0175529 | A1 | 11/2002 | Kwon |
| 2007/0046054 | A1 | 3/2007 | Hinman et al. |
| 2009/0169326 | A1 | 7/2009 | Hullmann et al. |
| 2011/0163562 | A1 | 7/2011 | Smith et al. |
| 2019/0113064 | A1 | 4/2019 | Fritzsch et al. |

FOREIGN PATENT DOCUMENTS

| | | | | |
|---|---|---|---|---|
| DE | 29718903 | U1 | 12/1997 | |
| DE | 20004580 | U1 | 7/2000 | |
| DE | 112009001765 | T5 | 8/2011 | |
| DE | 202015106289 | U1 | 12/2015 | |
| WO | WO03100267 | A1 | 12/2003 | |
| WO | WO-2016171863 | A1 * | 10/2016 | ......... B60R 13/0206 |
| WO | WO2016171863 | A1 | 10/2016 | |
| WO | WO2017194226 | A1 | 11/2017 | |

OTHER PUBLICATIONS

CN Office Action for CN Application No. 202011520050.4 dated Feb. 24, 2022 (12 pages).

* cited by examiner

RETAINING CLAMP OF A QUICK RELEASE FASTENING DEVICE, A QUICK RELEASE FASTENING DEVICE AS WELL AS A COMPONENT CONNECTION WITH THIS QUICK RELEASE FASTENING DEVICE

CROSS REFERENCE TO RELATED APPLICATIONS

This application claims the priority of German patent application No. DE102019135611.3, filed on Dec. 20, 2019. The entire content of this priority application is incorporated herein by reference in its entirety.

TECHNICAL FIELD

The present disclosure relates to a retaining clamp or clip of a quick release fastening device, which is latchable in a component opening and in which a fastening bolt is lockable. Furthermore, the present disclosure relates to a quick release fastening device with this retaining clamp in combination with a fastening bolt. Furthermore, the present disclosure is directed towards a component connection between at least a first component and a second component, in which the retaining clamp is fastened in a non-rotationally symmetrical first component opening of the first component and a bolt shaft of the fastening bolt passes through a second component opening in the second component.

BACKGROUND

In the prior art, two or more components have been connected with each other for years by means of a combination of a retaining clamp and a fastening bolt that is anchorable therein. The basis of such a connection is that the first component comprises an opening adapted to the retaining clamp for reliable fastening of the retaining clamp in this component opening. Based on the reliable fastening of the retaining clamp in a suitable component opening of the first component, anchoring the fastening bolt in the retaining clamp is sufficient for establishing a suitable connection to at least one further component. For this purpose, the shaft of the fastening bolt passes or engages through a corresponding opening in the second component and is then anchored in the retaining clamp.

According to different design possibilities of the retaining clamp, a form-fit or frictional connection is established between the retaining clamp and the connecting shaft engaging therein. With reference to DE 200 04 580 U1, a U-shaped anchoring portion comprises barb-like retaining webs projecting inwards. These retaining webs are inclined in the direction of insertion of the connecting shaft. Accordingly, they block the extraction of the connecting shaft in a barb-like manner, as this leads to compression of the webs in the anchoring portion. Although the barb-like webs of the anchoring portion realize a certain retention of the connecting shaft in the anchoring portion, they also have a damaging effect on the surface of the connecting shaft. This is because the barb-like webs dig into the surface of the connecting shaft and thus lead to damage to a corrosion protection layer that is present there, such as a layer of paint.

An alternative construction of a retaining clamp is disclosed in WO 03/100267 A1. The retaining clamp is comprised of spring legs arranged in a V-shape to each other, which form a receiving gap open at the top and closed at the bottom for a connecting shaft. For an easy manufacturing of the retaining clamp a continuous sheet metal strip is used, which is formed into the later V-shaped form. By the V-shaped design of the retaining clamp a receiving space for a connecting shaft or the like is formed. Barb-like blocking webs protrude into this receiving space. These webs are arranged inclined in the insertion direction for a connecting shaft. This means that the blocking webs are inclined in the direction of the closed end of the spring clamp. Due to their spring force, the spring webs anchor themselves in the surface of the connecting shaft inserted. If an attempt is made to release the connecting shaft from the retaining clamp, the spring webs are compressed and the surface of the connecting shaft is damaged accordingly. A similar principle using barbs is used in order to fasten the retaining clamp in a suitable component opening. This is because an additional spring web of each spring leg has a barb-like locking projection on its outer side. The outer side refers to the side of the spring leg that is not positioned between the spring legs arranged opposite to each other. While these latching webs support the retention of the retaining clamp in a component opening, they also cause damage to the component surface at least at the edge of the component opening when an attempt is made to extract it. This damage supports a susceptibility of the component to corrosion. DE 297 18 903 U1 also discloses a quick release fastening device which is comprised of a retaining clamp and a threaded bolt to be anchored therein. The retaining clamp is comprised of two spring legs arranged in a V-shape to one another, which are connected by a rectangular connecting web with each other. The connecting web comprises an insertion opening through which the shaft of the threaded bolt is insertable in the direction of a tapered open end of the V-shaped arrangement of the spring legs. The spring legs each comprise outwardly protruding latching noses in order to anchor the retaining clamp in a correspondingly adapted component opening. The outwardly directed spring force of the spring legs thus determines the retention forces which can be transferred to the edge of a component opening via the latching noses. This has the disadvantage that vibrations or strong extraction forces on a screwed-in threaded bolt can lead to a release or loosening of the connection between the component and the retaining clamp latched therein.

It is therefore an object of at least some implementations of the present disclosure to propose an alternative construction of retaining clamps of a quick release fastening device in comparison to known constructions, which, apart from a reliable retention, reduces or completely prevents damage to the component by the retaining clamp fastened to it during a possible extraction from the component opening.

SUMMARY

The above object is solved by a retaining clamp or clip of a quick release fastening device, by a quick release fastening device with this retaining clamp and a suitable fastening bolt as well as by a component connection between at least a first component and a second component with the above-mentioned retaining clamp and fastening bolt as well as a manufacturing method for the retaining clamp. Further embodiments and designs are set forth in the following description, the accompanying drawings and the appending claims.

The retaining clamp of a quick release fastening device is latchable in a component opening and a fastening bolt is lockable in the retaining clamp. The retaining clamp comprises the following features: two spring legs arranged opposite to each other in a V-shape, the arrangement of which comprises a tapered open end at which the V-shaped arranged spring legs are not connected to each other, and the arrangement of which comprises a widened end, at which the V-shaped arranged spring legs are connected to each other via a connecting web with a central passage opening, and each of the two V-shaped arranged spring legs comprises a central window with a spring web arranged therein, which is fastened on one side and is at least once angled in its course in the direction of the widened end.

The retaining clamp of the present disclosure is based on a known construction in, for example, quick release fastening devices or plug fastening devices. Such retaining clamps serve to receive and lock a fastening bolt or generally a connection bolt to connect in this way at least two components with each other. In doing so, the retaining clamp is insertable in a component opening, which may be a four-square or non-rotationally symmetrical component opening. The lack of rotational symmetry of the component opening ensures that the retaining clamp is retained in the component opening in a rotation-proof manner. This makes it possible to fasten in the retaining clamp a fastening bolt or connection bolt in the form of a threaded bolt or a bayonet bolt or with a similar connection construction which requires a rotation.

While the two spring legs arranged opposite to each other ensure that the fastening bolt or connection bolt is reliably retained in the retaining clamp, the absence of a connection between the two spring legs at the tapered open end of the retaining clamp ensures that a fastening bolt of non-adapted length is insertable into the retaining clamp. This is because, even if the fastening bolt comprises a length that should exceed the receiving length of the retaining clamp, the end of the fastening bolt protrudes beyond the retaining clamp without thereby creating an obstruction in the connection to be made or to be established. In the connection made between the two components by means of the fastening bolt and the retaining clamp, mechanical loads occur in the component with retaining clamp if extraction forces of the fastening bolt are to cause a release of the connection between fastening bolt and retaining clamp. In this case not only a reliable retention between retaining clamp and fastening bolt is required. It is equally important that the retaining clamp is reliably retained in the component opening of the first component. Even if such a retention cannot be ensured under all mechanical loads, a release of the retaining clamp from the component opening should not lead to damage to the first component.

In order to ensure this function, the spring web arranged in one window of each spring leg comprises an at least once angled shape. This angled shape does not take up the principle of barbed spring webs used in the prior art, which oppose possible extraction movements due to a compression. Rather, the specific shaping of the spring web, which uses an angled shape directed towards the inside of the retaining clamp and thus a peak directed towards the outside, produces supporting forces against releasing of the retaining clamp from the component opening that do not involve clawing or anchoring and thus damaging the component surface of the first component. The spring leg may generate the supporting and release-preventing forces in that it extends in the portion of its peak beyond an outer side of the respective spring leg of the retaining clamp. This is because this arrangement requires elastic deformation of the spring legs in the direction of the inside of the retaining clamp in order to be able to release it from the component opening. Such an attempt to release the retaining clamp with a fastening bolt anchored therein, however, may also have the effect that the spring web pressed into the retaining clamp cannot yield into the interior of the retaining clamp. This is because with such a yielding movement it meets the shaft of the fastening bolt, which is retained inside the retaining clamp. In this way, the retaining or blocking forces applied by the spring web may be increased. Despite this reinforcement, the effect of extraction forces for the retaining clamp from the first component opening may not damage the component surface of the first component.

According to a further design of the retaining clamp, the two spring webs of the V-shaped arranged spring legs are arranged opposite to each other and each comprise a concave inner side and a convex outer side.

With regard to the construction of the retaining clamp, the interior of the retaining clamp is defined by the fact that it is limited by the two spring legs arranged opposite to each other. Thus, an inner side of the spring web is the side facing the opposite spring web and spring leg. Accordingly, the outer side of the spring web and also of the spring leg is the side facing away from the opposite spring leg and spring web. With regard to the shape of the spring web, it has been shown that a shape of the spring web that is arched towards the outer side supports the desired retaining and blocking forces. In this way, a concave inner side and a convex outer side of the respective spring web results. The convex outer side, that is, the corresponding curve of the spring web in the direction facing away from the opposite spring leg, produces a peak, which may also extend beyond the outer side of the spring leg. This makes it necessary to push the peak (i.e., the outward arch of the spring web) towards the inside of the retaining clamp when inserting or releasing the retaining clamp from the corresponding component opening in order to displace the retaining clamp into the component opening.

In this context, it may be preferred, depending on the desired retention force, to form the arched shape of the respective spring web with a certain radius of curvature and/or with a certain extension beyond the outer side of the spring leg. This is because the further the arch of the spring web extends beyond the outer side of the corresponding spring leg, the higher the retaining and thus the release forces for the retaining clamp will be. In addition, it has been shown in various designs of the present disclosure that the smaller the radius of curvature of the arch in the spring web, the higher the retaining and blocking forces for the retaining clamp in the component opening can be.

According to a further design, the convex outer side of the spring webs may comprise a smooth surface.

In order to prevent damage to the component surface of the first component opening when the retaining clamp is released from the component opening and when the retaining clamp is continuously reliably retained in the component opening despite extraction forces acting, the avoidance of sharp edges on the surface of the spring webs has proven to be advantageous. This is because due to the absence of sharp edged designs in the shape of the spring webs, portions of the spring webs that dig into the surface of the second component and/or into the surface of the fastening bolt are avoided. The damage to the surface of the component avoided in this way results in neither reducing the stability of the component nor creating targets for possible corrosion of the component. This is because a smoothly formed surface of the spring web on the outer side may ensure that the spring web slides off the first component without damage, especially on the edge of the component opening of the first component.

According to another design of the retaining clamp, the spring webs comprise at least a first peak which extends beyond an outer surface of the spring legs. According to a further design of the present disclosure, the spring webs are at least twice angled in their course and a second peak of the respective spring web extends beyond an inner side of the respective spring leg towards the opposite spring leg.

For the functionality of the retaining clamp, such as for improved retention and a stable position of the retaining clamp in the component opening, it has been found to be advantageous in at least some implementations to provide two peaks along the course of the spring webs which are arranged in opposite directions. This means that starting at the open end of the V-shaped arranged spring legs, that is, starting at the fixed end of the spring web, first a first peak based on an outward arch of the spring web is provided and then a second peak based on an inward arch of the spring web is provided. Here, the first peak with its outward arch may provide support forces for the spring web at the edge of the component opening of the first component. The second peak, with the spring web arching inwards, that is, directed towards the opposite spring leg, may create support forces at the shaft of the fastening bolt, which is inserted into the retaining clamp. These supporting forces may support each other in case a bolt inserted into the retaining clamp experiences extraction forces from the retaining clamp. This is because in this case the outward arch of the first peak is supported at the edge of the first component opening, while at the same time the support of the second peak at the shaft of the fastening bolt prevents or at least restricts or hinders the spring web from yielding inwards in a resilient or springy manner.

According to another design of the retaining clamp, each spring leg comprises two guide lugs arranged opposite to each other which protrude perpendicular from an inner side of the spring legs.

The interior of the retaining clamp may be limited by the two V-shaped oriented spring legs arranged opposite to each other. The inner space of the retaining clamp is open to the side of these spring legs so that a shaft of the fastening bolt to be inserted can move or yield in this direction. In order to avoid the resulting difficulties in establishing a connection between retaining clamp and fastening bolt, the guide lugs may limit a lateral movement or yielding of the bolt shaft, for example during the insertion or the release of the fastening bolt from the retaining clamp.

The present disclosure includes a quick release fastening device with a retaining clamp according to one of the designs described above and a fastening bolt, wherein the fastening bolt comprises a head and a bolt shaft which is latchable or fastenable in the retaining clamp due to its shaft contour.

Furthermore, the present disclosure includes a component connection between at least a first component with a four-square or non-rotationally symmetrical first component opening, in which the retaining clamp may be fastened according to one of the above-described designs, and a second component with a second component opening, through which a bolt shaft of a fastening bolt extends and in which the retaining clamp is latched, wherein a head of the fastening bolt is supported on the second component.

The present disclosure also includes a manufacturing method of a retaining clamp according to one of the designs described above, which comprises the following steps: punching out a flat sheet metal piece which defines the shape features of the retaining clamp in a flat form, and then bending the punched out sheet metal piece in such a manner that the spring legs are given the V-like shape and the spring webs have a curved course.

The manufacturing method may also comprise the further step: applying a corrosion protection layer or other surface coating to the retaining clamp. As an alternative to this, it may also be preferred to feed a piece of sheet metal made of a corrosion-resistant steel, which may be stainless steel, to the first process step of punching out.

BRIEF DESCRIPTION OF THE DRAWINGS

The designs of the present disclosure are explained in more detail with reference to the accompanying drawing. Showing.

DETAILED DESCRIPTION

Figure 1:
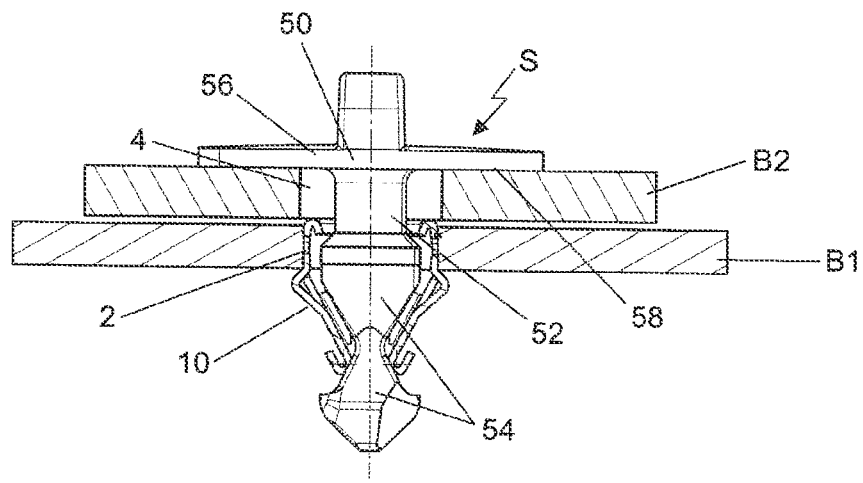
FIG. 1 a side sectional view of a connection of a first component and a second component by means of the retaining clamp and a fastening bolt, FIG. 2 an exploded view of the connection according to FIG. 1, FIG. 3 an enlarged perspective view of a design of the retaining clamp, FIG. 4 the retaining clamp according to FIG. 3 in a side view, FIG. 5 the retaining clamp according to FIG. 3 in another side view, FIG. 6 a section through the retaining clamp according to FIG. 5 along the line of cut indicated there, FIG. 7 a partial sectional view of the retaining clamp inserted in the first component opening with a fastening bolt anchored therein, FIG. 8 a further illustration of the arrangement of FIG. 7 under the effect of extraction forces on the fastening bolt, FIG. 9 a further illustration of the arrangement according to FIG. 7 under the effect of increased extraction forces, FIG. 10 a further illustration of the arrangement according to FIG. 7 with a further increase of the extraction forces compared to the arrangement in FIG. 9, FIG. 11 a design of a fastening bolt, FIG. 12 a further design of a component connection with the fastening bolt according to FIG. 11 and the retaining clamp, FIG. 13 a bottom view of the component connection according to FIG. 12, FIG. 14 a further design of the fastening bolt, FIG. 15 a further design of the component connection with the fastening bolt according to FIG. 14, FIG. 16 a view of the component connection according to FIG. 15 from below, FIG. 17 a further design of the fastening bolt, FIG. 18 a further design of a component connection with the fastening bolt according to FIG. 17, FIG. 19 a view of the component connection according to FIG. 18 from below, and FIG. 20 a flowchart of an embodiment of a manufacturing method of the retaining clamp.
Figure 2:
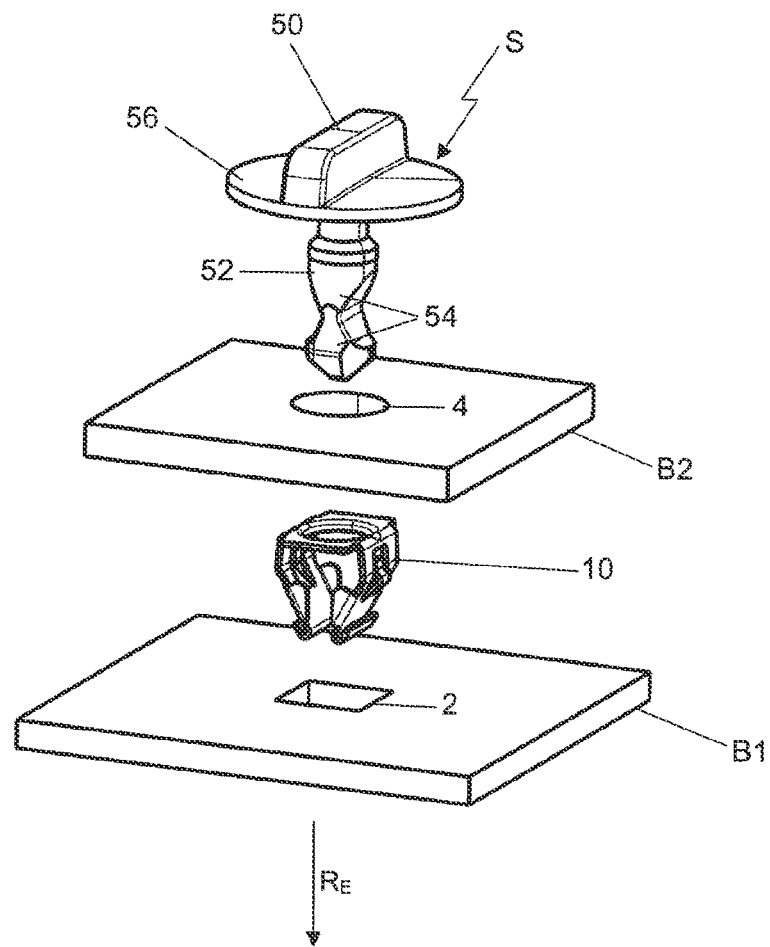
Figure 3:
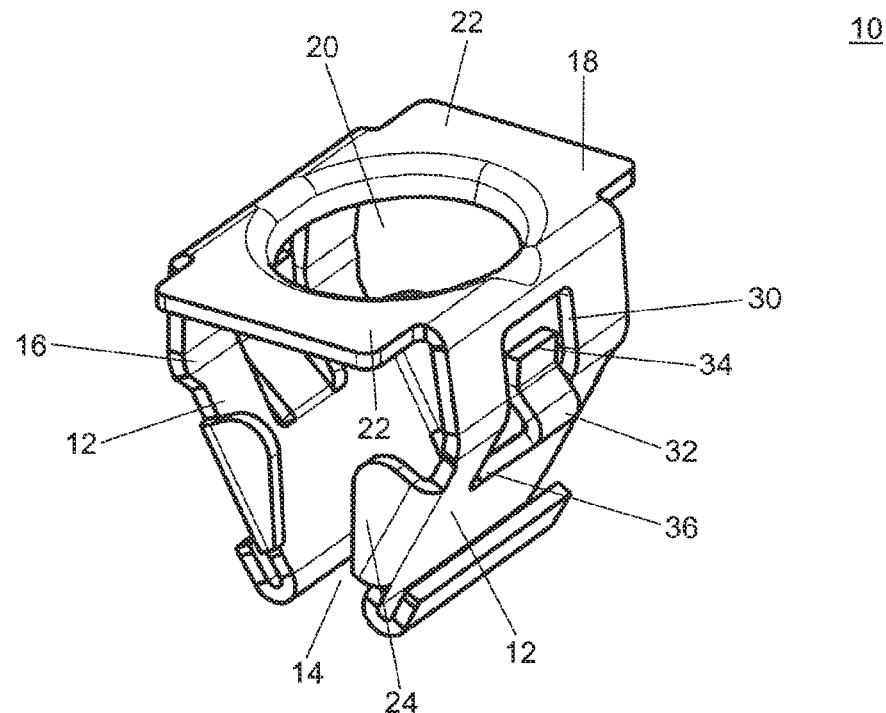

FIGS. 1 and 2 show a component connection between a first component B1 and a second component B2. The at least two components B1, B2 are connected to each other via a quick release fastening device S. The quick release fastening device S may be comprised of a retaining clamp 10, which is arranged in a first component opening 2 in the first component B1, and a fastening bolt or connection bolt 50, which passes or engages through a second component opening 4 in the second component B2. While the retaining clamp 10 may be retained in the first component opening 2, a shaft 52 of the fastening bolt 50 is fastened in the retaining clamp 10. For this purpose, the shaft 52 may comprise a connection geometry 54, which serves to fasten or lock the fastening bolt 50 and can be shaped differently according to different designs.

Figure 11:
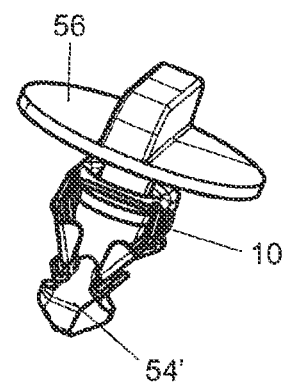
Figure 12:
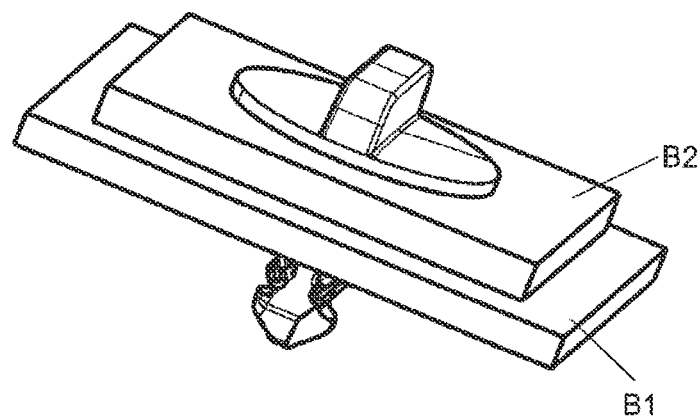
Figure 13:
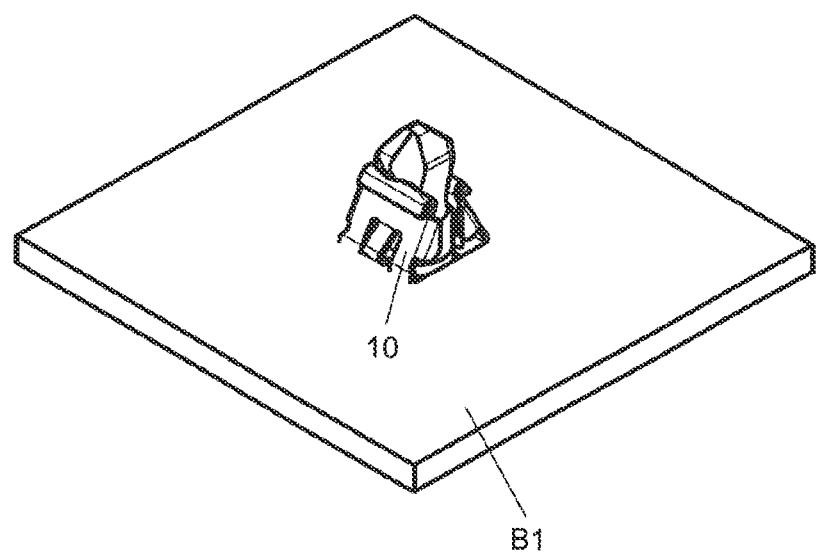
Figure 14:
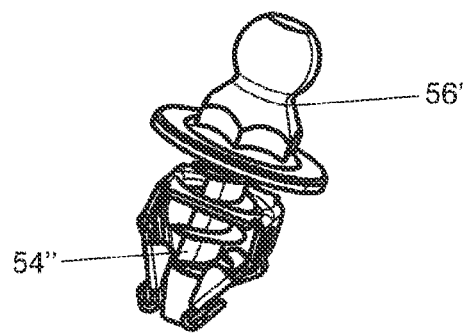
Figure 15:
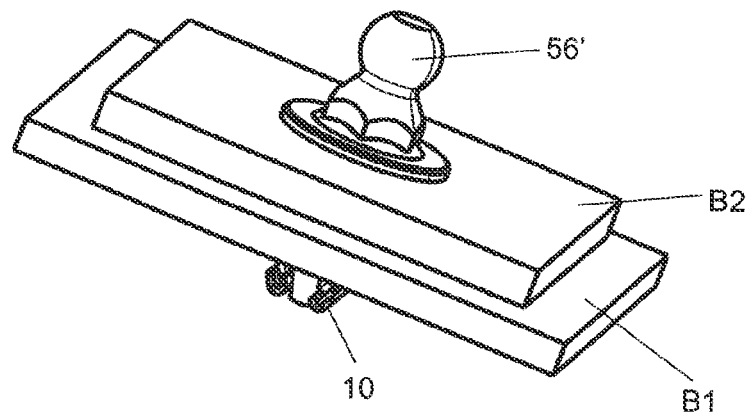
Figure 16:
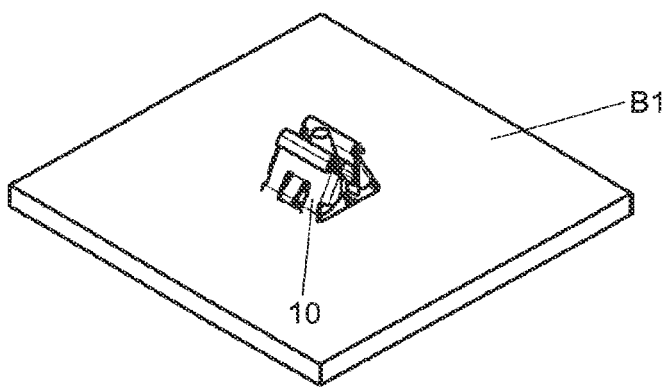

The connection geometries 54, 54' of the fastening bolt 50 in FIGS. 1, 2 and 11 show a fastening curve or curve geometry with which a connection to the retaining clamp 10 may be established. Depending on the design of the curve geometry 54; 54', the fastening bolt 50 can be connected to the retaining clamp 10 by turning it to the left or right and released again in the opposite direction of rotation. The same applies to the thread-like connection geometry 54" as shown in FIG. 14 as an example. The connection geometry 54''' according to FIG. 17 has a fastening curve which may ensure that the connection geometry 54''' automatically latches in the retaining clamp 10 and thus the fastening bolt 50. For this purpose, the fastening bolt 50 is pressed into the retaining clamp 10 in the direction of its longitudinal axis until it has latched into the retaining clamp 10.

The fastening bolt 50 also comprises a head 56, which is connected to the connection geometry 54 via the shaft 52. Despite different geometric designs, the head 56 comprises a head underside 58. The head underside 58 is supported in the component connection on the second component B2, while the shaft 52 passes through the second component opening 4.

Figure 17:
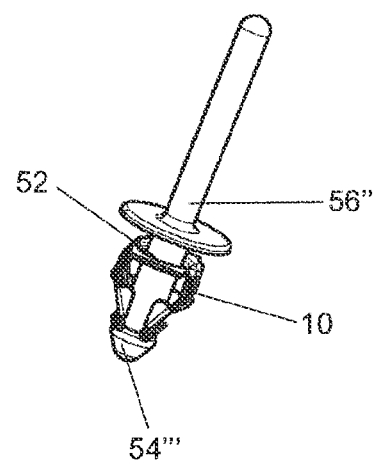
Figure 18:
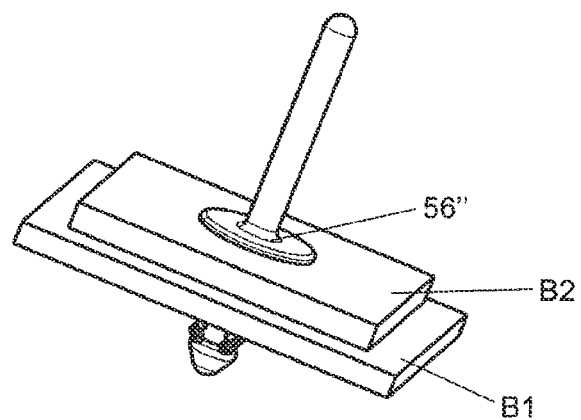
Figure 19:
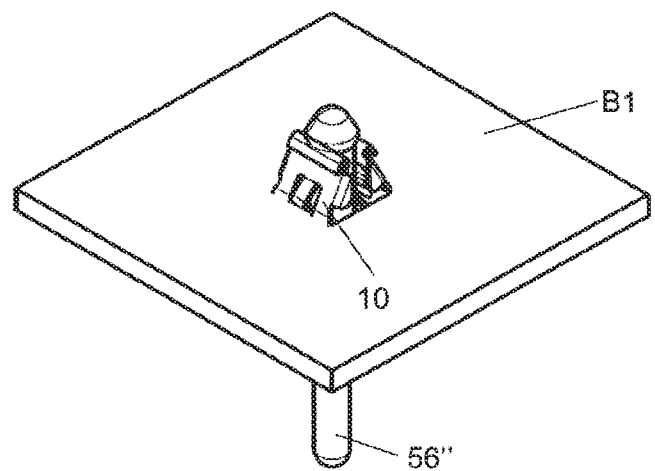

Further designs of the head 56', 56" are shown in FIGS. 14 and 17. The head 56' in FIG. 14 is a ball head with a hexagon as driving means. The driving means is advantageous because the connection geometry 54" is formed as a thread. In addition, the ball head is suitable for manufacturing a plug-in connection to an attachment part or the like via a suitable coupling, for example.

In FIG. 17, the head 56" has a circumferential collar that provides the head underside 58. Opposite the shaft 52, a bolt-like web is provided, which provides a connection possibility to another component.

A further embodiment of the retaining clamp 10 is shown in greater detail in FIGS. 3 to 6. According to a design of the retaining clamp 10, it is manufactured as a punched and bent sheet metal part. Another embodiment of the retaining clamp 10 may be to have the retaining clamp 10 injection molded from plastic, which may be a thermo-plastic, or produced by 3D printing.

Figure 4:
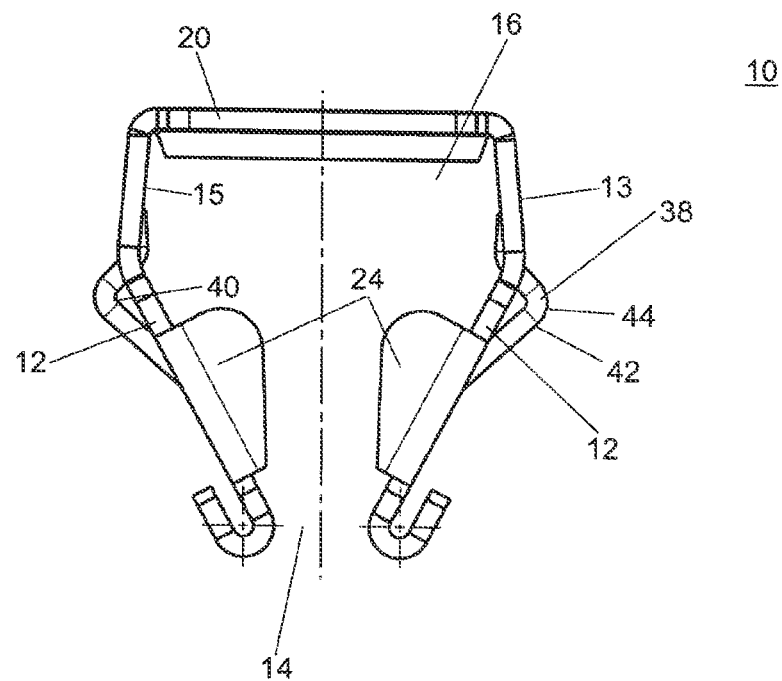

The retaining clamp 10 has a V-shaped basic structure, which is not only visible in the side view of the retaining clamp 10 in FIG. 4. The V-shaped construction is formed by two spring legs 12 arranged symmetrically to each other. The appropriate plane of symmetry for the symmetrical arrangement of the spring legs 12 is described by the dash-point line in FIG. 4, which extends centrally between the oppositely arranged spring legs 12.

The V-shaped arrangement of the spring legs 12 has a tapered open end 14. At this open end 14, the two ends of the spring legs 12 that extend towards each other are not connected to each other. Instead, the spring legs 12 end at the tapered end 14 at a distance from each other. The tapered open end 14 ensures that a free end of the shaft 52, the connection geometry 54, may at least partially pass through the tapered open end 14 in order to be fastened or retained there. Due to this construction, the shaft 52 of the connection bolt 50 is not limited in its length by the retaining clamp 10 and its tapered end 14.

In addition, the open tapered end 14 allows a free resilient deflection of the spring legs 12 ending there. This resilient deflection of the tapering spring legs 12 ensures a snap-in connection or a thread connection or a bayonet connection between the ends of the spring legs 12 and the connection geometry 54 of the fastening bolt 50 (see FIGS. 1, 11, 13, 14, 17, 19).

The V-shaped arrangement of the spring legs 12 also comprises a widened end 16. At the widened end 16 the two spring legs 12 may be connected to each other via a connection web 18 (see FIG. 3). The connection web 18 may be connected integrally to the two spring legs 12 and thus determines the mutual distance between the spring legs 12 at the widened end 16.

The connection web 18 has a four-square shape, which may be interrupted by a central passage opening 20. The passage opening 20 is alternatively round, elliptical, oval or has the shape of a slotted or elongated hole. The passage opening 20 may be adapted to the shaft 52 of the fastening bolt 50 to be accommodated or to be received and/or to the easiest possible insertion and connection of the fastening bolt 50 with the retaining clamp 10.

The integral connection between the connection web 18 and the laterally arranged spring legs 12 may result in a four-square cross-section of the retaining clamp 10, which is to be accommodated in the first component opening 2. The four-square cross section may be square or rectangular in shape depending on the dimensions of the spring legs 12 and the connection web 18. Due to the non-rotationally symmetric cross section of the retaining clamp 10 in an insertion direction RE, the retaining clamp 10 may be inserted into the first component opening 2 with an analogous, also non-rotationally symmetric contour (see FIG. 2). The shape of the cross section of the retaining clamp 10 and the first component opening 2 ensures that the retaining clamp 10 is arranged in the first component opening 2 in a rotation-proof manner.

The connection web 18 may comprise two lateral tabs 22 arranged opposite to each other. The tabs 22 are arranged on the sides of the connection web 18 which are not occupied by the spring legs 12.

Figure 5:
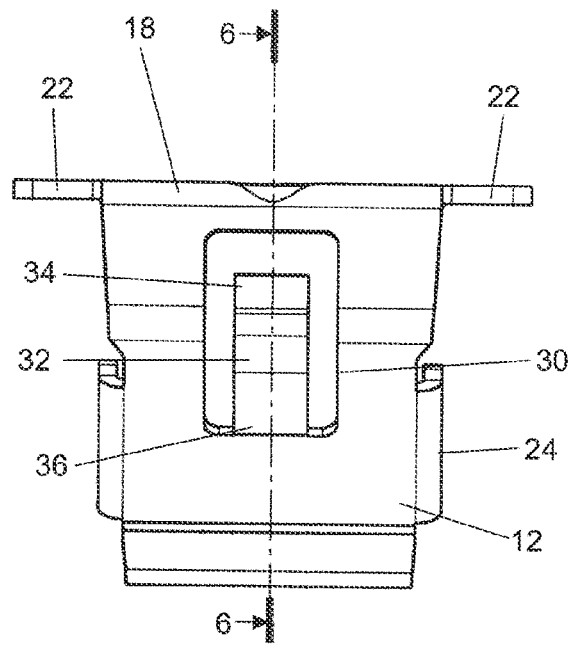
Figure 6:
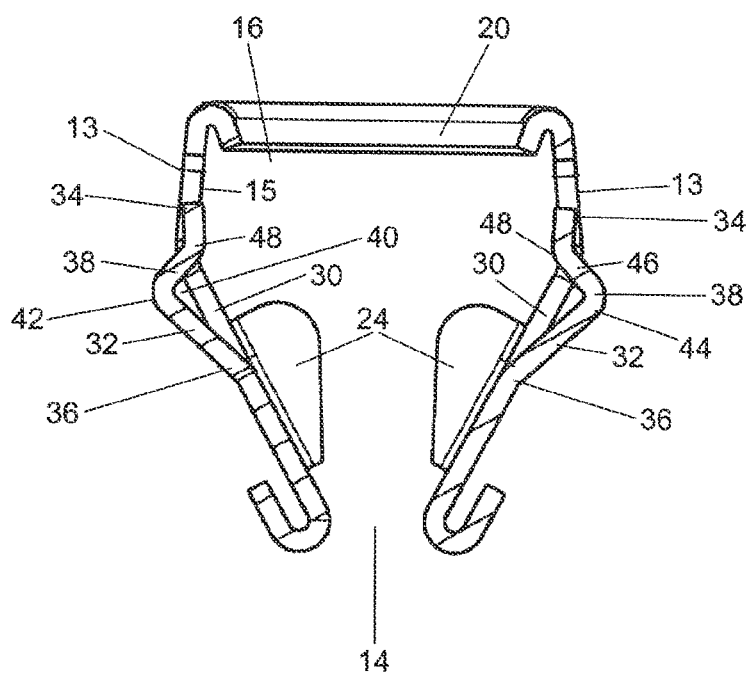

The spring legs 12, which may be formed and arranged symmetrically to each other, each comprise a window or an aperture 30. The window 30 may have a rectangular shape, the longer side of which extends towards the V-shaped spring legs 12. The window 30 may also be arranged centrally in relation to the width of the spring leg 12, as shown in FIG. 5 with regard to the centrally aligned cut plane for FIG. 6.

Within the window 30 a spring web 32 is centrally arranged. The spring web 32 has a free end 34, which faces the widened end 16, as well as a fixed end 36, which is integrally connected to the spring leg 12 and faces the open end 14.

The spring web 32 has, in its course, starting at its fixed end 36 in the direction of its free end 34, at least one first arch 38, which may extend beyond the outer side 13 of the spring leg 12. A peak 44 of the first arch 38 forms the point which may be positioned the furthest outside the V-shaped arrangement of the spring legs 12. There, the first arch 38 with the peak 44 may form a resilient latching and/or retaining abutment at the first component B1 in order to prevent a release of the retaining clamp 10 from the first component opening 2.

The outer side 13 of the spring leg 12 is defined by the side of the spring leg 12 facing away from the other spring leg 12. The first arch 38 is formed by a curvilinear course of the spring web 32, so that the spring web 32 comprises in the portion of the first arch 38 a concave inner side 40 facing the other spring web 32 and a convex outer side 42 facing away from the other spring web 32.

According to a further design, the spring web 32 comprises a second arch 46 in its course. The second arch 46 is arranged between the first arch 38 and the free end 34 of the spring web 32. It may be qualified by a curvilinear course of the spring web 32, which comprises a concave second outer side and a convex second inner side. Accordingly, the convex second inner side comprises a second peak 48, which may protrude beyond the inner side 15 of the spring leg 12. It follows from this that the first arch 38 and the second arch 46 are formed in opposite directions to each other, so that their respective peaks extend once beyond the outer side 13 and once beyond the inner side 15 of the respective spring leg 12.

The second arch 46 of the spring web 32 may form with the second peak 48 and the free end portion 49 of the spring web 32 a supporting and retaining support web, which is supported by a shaft 52 of a fastening bolt 50 inserted into the retaining clamp 10. This is particularly the case when, with extraction forces acting on the fastening bolt 50, an edge of the first component opening 2 presses the spring web 32 towards the other spring web 32 and inwards into the retaining clamp 10 via the first arch 38. This is explained in detail below with reference to FIGS. 7 to 10.

FIGS. 7 to 10 illustrate the quick release fastening device S comprised of the retaining clamp 10 and the fastening bolt 50 which connects the two components B1, B2 with each other. The retaining clamp 10 is latched to the component opening 2 and the shaft 52 of the fastening bolt 50 passes through the second component opening 4. The connection geometry 54 retains the fastening bolt 50 in the retaining clamp 10 and at the same time supports the retaining clamp 10 in the first component opening 2. To illustrate this situation and the effect of extraction forces in direction $R_A$ on the fastening bolt 50 and on the retaining clamp 10, the retaining clamp 10 and the fastening bolt 50 are shown in FIGS. 7 to 10 in partial section. With regard to the retaining clamp 10, this partial section essentially corresponds to the details illustrated in FIG. 6.

Figure 7:
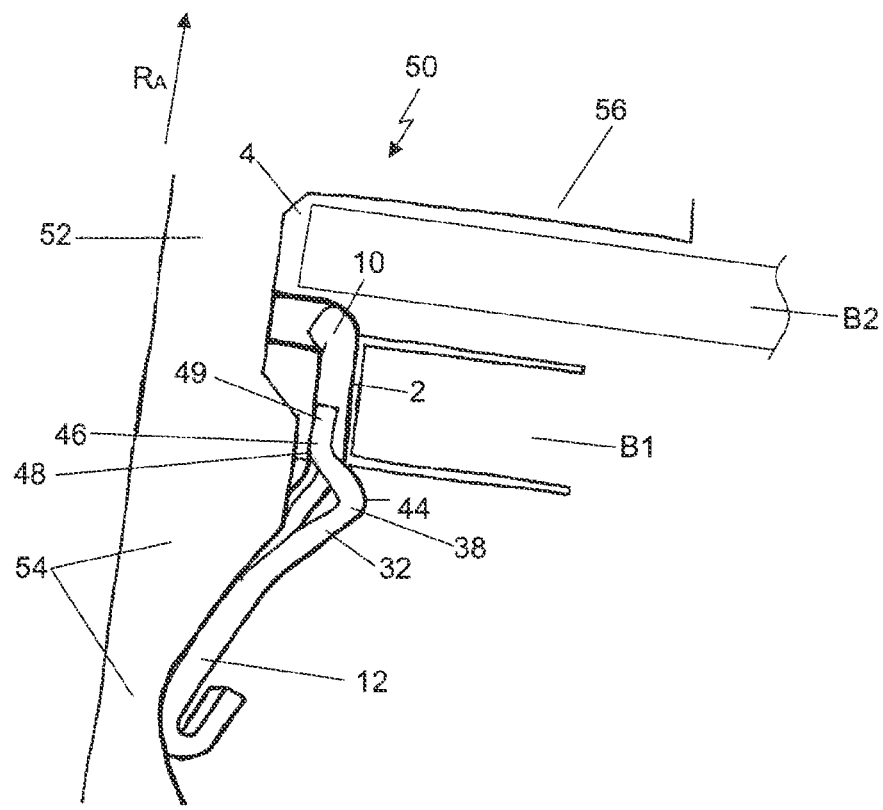

FIG. 7 shows the component connection between the first component B1 and the second component B2 via the quick release fastening device S. For this purpose, the connection geometry 54 is completely latched and/or fastened in the retaining clamp 10. Correspondingly, over large portions in the portion of the open end 14, the spring legs 12 abut at the connection geometry 54. One part of the first arch 38 of the spring leg 32 is supported with its outer side on the edge of the first component opening 2 of the first component B1. The free end portion 49 of the spring web 32 is relieved. In at least some implementations, it does not abut at the connection geometry 54.

Figure 8:
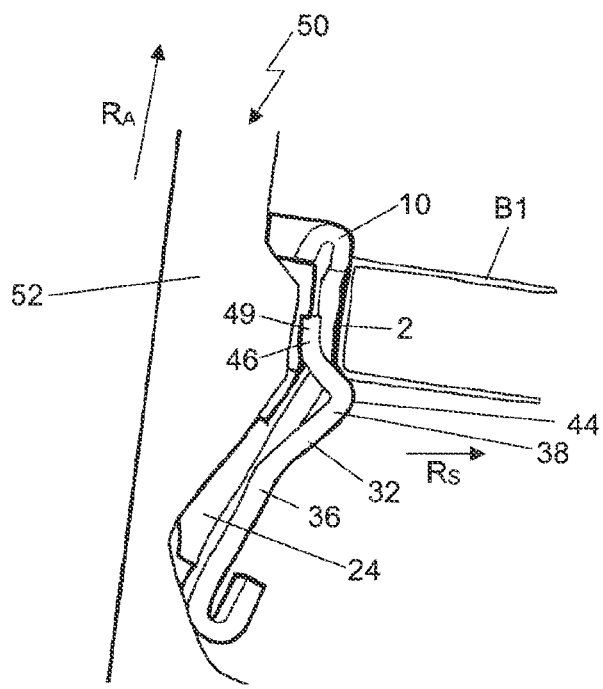
Figure 9:
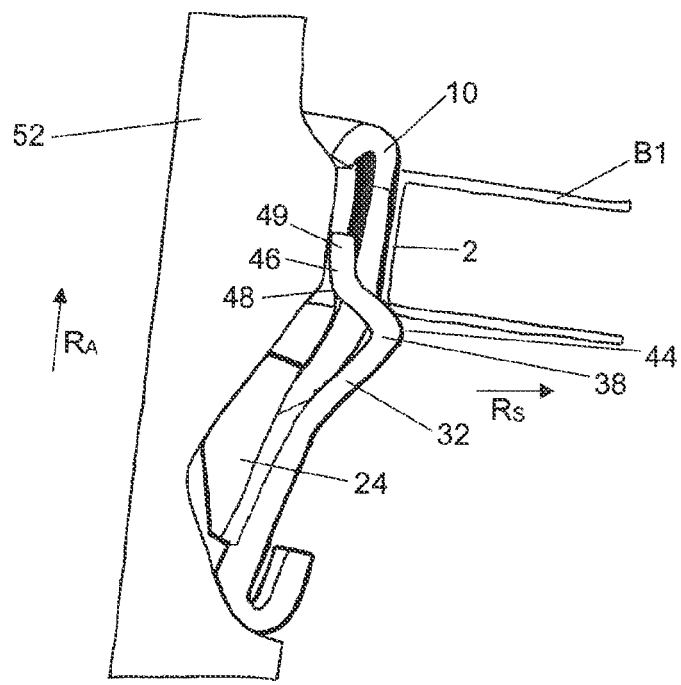
Figure 10:
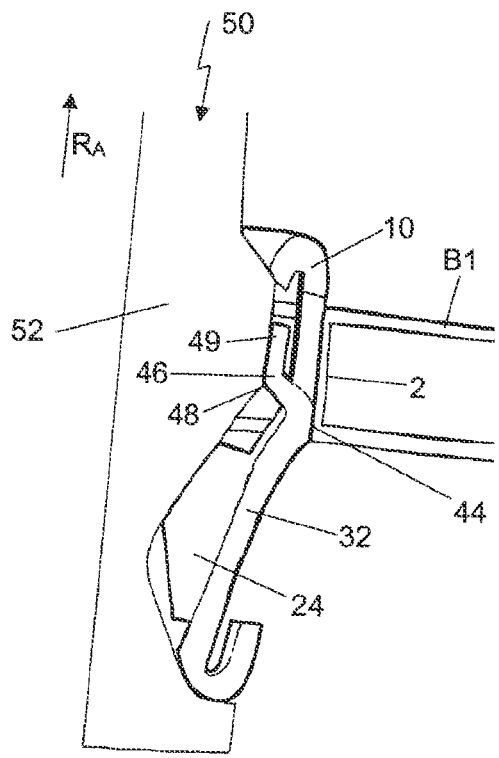

In the FIGS. 8, 9, 10 it is shown under which deformations of the retaining clamp 10 the fastening bolt 50 and the retaining clamp 10 are removable from the first component opening 2. In this context it is important that, despite the deformations of the spring web 32, damage to the first component B1 is avoided. This is because, due to the construction of the spring web 32, the deformations of the retaining clamp 10 do not lead to sharp edges being present at the retaining clamp 10 and digging into the component surface of the first component B1, thus causing damage.

If extraction forces in the direction $R_A$ move the fastening bolt 50 and in particular the shaft 52 in the direction $R_A$, the spring legs 12 slide or slip continuously in the portion of the open end 14 on the connection geometry 54. In this way, in addition to the spring legs 12, the spring webs 32 are also pressed laterally outwards in the direction $R_S$. This may strengthen the retention of the retaining clamp 10 in the component opening 2. This is because, in order to release the retaining clamp 10 from the first component opening 2, the spring web 32 may be displaced in the direction of the shaft 52 against increasing outwardly acting spring forces or retention forces by the edge of the first component opening 2. At this, the edge of the first component opening 2 and the first component B1 will not take damage as the spring web 32 abuts with its smooth outer surface at the first component B1.

If the extraction forces in direction $R_A$ are sufficiently high, the fastening bolt 50, which moves due to the extraction forces, displaces the retaining clamp 10 in the direction $R_A$. At this, the outer surface of the spring web 32 slides further off the first component B1 and especially along the edge of the first component opening 2. This movement becomes obvious when comparing FIGS. 7 to 9. It can be seen that the sliding of the outer surface of the spring web 32 at the first component B1 deforms the spring web 32 inwards in the direction of the shaft 52 until the spring web 32 increasingly abuts there with its free end portion 49. Thus, the first arch 38 of the spring web 32 causes an increasing resilient deformation of the spring web 32 due to the sliding of the spring web 32 on the first component B1 and thus an increase of the extraction forces due to increasing retention forces of the retaining clamp 10.

The end portion 49, which engages and/or abuts at the shaft 52, initially counteracts any further deformation of the spring web 32 in the direction of the shaft 52. This is due to the shape of the second arch 46.

Sufficiently strong extraction forces in the direction $R_A$ further deform the spring web 32 (see FIG. 10). Despite the support of the end portion 49 at the shaft 52, the spring web 32 is deformed in the portion of its first arch 38 without damaging the component to such an extent that it can slide and move into the first component opening 2. Thus, the retaining clamp 10 with fastening bolt 50 is removable from the first component opening 2.

Figure 20:
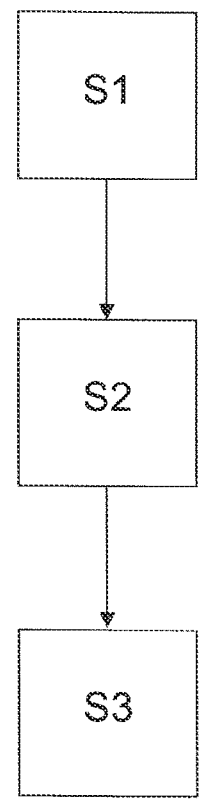

FIG. 20 shows a flow chart of a manufacturing method for the retaining clamp 10. In a first step S1 a flat piece of sheet metal may be punched out, which determines the shape of the later retaining clamp 10. In this piece of sheet metal, the connection web 18 with its shapes as well as the spring legs 12 with the shapes described above may be provided.

In a subsequent step S2, the sheet metal piece is bent into the desired shape. This gives the spring legs 12 the V-like shape and the spring webs 32 may be formed in their course according to the shape features described above.

In a third step S3, a corrosion protection layer or other surface coating may be applied to the retaining clamp 10. As an alternative to this, it may be preferred to feed a sheet of corrosion-resistant steel, particularly stainless steel, to the punching process in step S1.

The invention claimed is:
1. A retaining clamp of a quick release fastening device, which is latchable in a component opening and in which a fastening bolt is lockable, comprising the following features:
   a. two spring legs arranged opposite to each other in a V-shape, the arrangement of which comprises a tapered open end at which the V-shaped arranged spring legs are not connected to each other, and the arrangement of which comprises a widened end at which the V-shaped arranged spring legs are connected to each other via a connection web with a central passage opening, and
   b. each of the two spring legs arranged in a V-shape comprises a window with a spring web arranged therein, which is fastened on one side and is at least twice angled in its course in the direction of the widened end, wherein c. a first peak extends beyond an outer surface of the spring legs and a second peak extends beyond an inner side of the respective spring leg towards the opposite spring leg.

2. The retaining clamp according to claim 1, in which the two spring webs of the spring legs arranged in a V-shape are arranged opposite to each other and each comprise a concave inner side and a convex outer side.

3. The retaining clamp according to claim 2, in which each spring leg comprises two guide lugs arranged opposite to each other, each of which projects perpendicularly from an inner side of the spring leg.

4. The retaining clamp according to claim 2, in which the convex outer side of the spring webs comprises a smooth surface.

5. The retaining clamp according to claim 4, in which each spring leg comprises two guide lugs arranged opposite to each other, each of which projects perpendicularly from an inner side of the spring leg.

6. The retaining clamp according to claim 1, in which each spring leg comprises two guide lugs arranged opposite to each other, each of which projects perpendicularly from an inner side of the spring leg.

7. A quick release fastening device comprising a retaining clamp according to claim 1 and a fastening bolt, wherein the fastening bolt comprises a head and a bolt shaft which is latchable in the retaining clamp due to a shaft contour.

8. A component connection between at least a first component having a four-square first component opening in which the retaining clamp according to claim 1 is fastened, and a second component having a second component opening through which a bolt shaft of a fastening bolt extends and is latched in the retaining clamp, wherein a head of the fastening bolt is supported on the second component.

9. A manufacturing method of a retaining clamp of a quick release fastening device which is latchable in a component opening and in which a fastening bolt is lockable, comprising the following steps:

S1 punching out a flat sheet metal piece which defines the shape features of the retaining clamp in flat form, and then S2 bending the punched out sheet metal piece in such a manner that the spring legs are arranged opposite to each other in a V-shape, the arrangement of which comprises a tapered open end at which the V-shaped arranged spring legs are not connected to each other, and the arrangement of which comprises a widened end at which the V-shaped arranged spring legs are connected to each other via a connection web with a central passage opening, and each of the two spring legs arranged in a V-shape comprises a window with a spring web arranged therein, which is fastened on one side and is at least twice angled in its course in the direction of the widened end, wherein a first peak extends beyond an outer surface of the spring legs and a second peak extends beyond an inner side of the respective spring leg towards the opposite spring leg.

10. The manufacturing method according to claim 9, in which the sheet metal piece is made of a corrosion-resistant steel.

11. The manufacturing method according to claim 9, with the further step:

S3 applying a corrosion protection layer or other surface coating on the retaining clamp.

\* \* \* \* \*